United States Patent [19]

Heinze et al.

[11] Patent Number: 4,810,677
[45] Date of Patent: Mar. 7, 1989

[54] HEAT-INSULATING LINING FOR A GAS TURBINE

[75] Inventors: Reinhard Heinze; Klaus Mörgenthaler, both of Stuttgart; Ines Maiwald, Schwaikheim; Wolfgang Kroenert, Aachen, all of Fed. Rep. of Germany

[73] Assignee: Daimler-Benz Aktiengesellschaft, Fed. Rep. of Germany

[21] Appl. No.: 119,478

[22] Filed: Nov. 12, 1987

[30] Foreign Application Priority Data

Nov. 12, 1986 [DE] Fed. Rep. of Germany ....... 3638658

[51] Int. Cl.$^4$ ............................................. C04B 35/76
[52] U.S. Cl. ....................... 501/95; 428/113; 428/220; 428/236; 428/239; 428/245; 428/246; 428/289; 428/302; 428/337; 428/701
[58] Field of Search ................. 501/95; 428/113, 220, 428/236, 239, 245, 246, 289, 302, 337, 701

[56] References Cited

U.S. PATENT DOCUMENTS

| | | | |
|---|---|---|---|
| 4,075,364 | 2/1978 | Panzera | 427/34 |
| 4,238,257 | 12/1980 | Remi et al. | 428/302 |
| 4,526,824 | 7/1985 | Dworak et al. | 428/302 |

Primary Examiner—William R. Dixon, Jr.
Assistant Examiner—David M. Brunsman
Attorney, Agent, or Firm—Barnes & Thornburg

[57] ABSTRACT

A heat-insulating lining for a gas turbine which consists of a mat formed of ceramic fibers that is provided on its side facing the hot gas with a metal-oxide-containing layer, especially $Al_2O_3$. The mat to be provided with the ceramic layer should possess a gross density of 350 to 450 kg/m$^3$ and the fibers in the mat which are in contact with the metal oxide-containing layer are to be predominantly so oriented that the longitudinal axis of the fibers forms an angle of 30° to 90° with the metal oxide-containing layer. It is preferred if the fibers form an approximately right angle with the metal oxide-containing layer. The thus made coated heat-insulating linings possess a good mechanical stability with respect to the hot gases as well as an adequate thermo-shock resistance.

7 Claims, 1 Drawing Sheet

HEAT-INSULATING LINING FOR A GAS TURBINE

BACKGROUND AND SUMMARY OF THE INVENTION

The present invention relates to a heat-resistant lining for a gas turbine, consisting of a mat formed of ceramic fibers which is provided on its side facing the hot gas with a metal oxide-containing layer.

Gas turbines, as are provided in particular for use in the motor vehicle industry, must be operated for economy reasons at very high process temperatures that lie at about 1,300° C. and higher. The supporting metallic parts of the turbine housing must be thermally insulated against these high temperatures.

A heat-resistant insulation is known from the DE-OS No. 26 30 247 which is formed of a ceramic fiber-mat on which a metallic oxide layer is applied on its side facing the hot gases. However, it is known from the DE-OS No. 34 46 649 that this lining does not possess a sufficient thermo-shock resistance so that during operation cracks occur in the lining which at the very high mechanical energy of the flowing gases very soon lead to damages of the lining.

The present invention is therefore concerned with the task to so further develop a heat-insulating lining for a gas turbine, consisting of a mat formed of ceramic fibers which is provided on its side facing the hot gas with a metallic oxide-containing layer, that no damages can occur any longer in the lining under alternate thermal stressing.

The underlying problems are solved according to the present invention in that the mat formed of ceramic layer has a gross density of 350 to 450 kg/m$^3$ and the fibers in the mat which are in contact with the metal oxide-containing layer, are to be predominantly so oriented that the longitudinal axis of the fibers forms an angle of 30° to 90° with the metal-oxide-containing layer.

The danger of the occurrence of stress cracks and therewith of the destruction of the lining is eliminated in that, on the one hand, one utilizes a ceramic fiber mat which possesses a gross density of 350 to 450 kg/m$^3$ and in that, on the other, the fibers in contact with the metal oxide-containing layer are predominantly so oriented in the mat that the longitudinal axis of the fibers forms an angle of 30° to 90° with the metal-oxide-containing layer. It is most favorable if the metal-oxide-containing layer is applied on the end faces of the fibers, i.e., if the longitudinal axis of the fibers forms about an angle of 90° with the metallic oxide-containing layer.

The usual high temperature-resistant fibers, also with colloidal silicic acid as binder, can be used as fiber material. It generally involves fibers from the system $Al_2O_3 \cdot SiO_2$ with very high $Al_2O_3$ contents. They are made depending on the $Al_2O_3$-content either by air-blasting or jet treatment of silicate melts (aluminum silicate fibers) or are spun from solutions (mullite-, aluminum oxide fibers). Aluminum silicate fibers can possibly be stabilized with slight quantities of $Cr_2O_3$. The gross density of the fiber mats formed from these fibers is to be between 350 and 450 kg/m$^3$. If one drops below this density, then the strength is reduced as well as the coating ability of the fiber material, whereas if one exceeds the density of 450 kg/m$^3$, then the heat conductivity of the fiber material increases and the temperature change resistance decreases. Preferred is a mat with a gross density of about 400 kg/m$^3$. The thickness of the mat can be considerable depending on the technical exigencies and frequently amounts to 30 mm and more.

The mat is manufactured with such a fiber orientation that the metal-oxide-containing layer can extend essentially at an angle of about 90° to the longitudinal axis of the fibers. Owing to this binding of the metal oxide-containing layer at the end faces of the fibers, a particularly good thermo-shock resistance is attained. However, it has also been found that a sufficient thermo-shock resistance is still attainable up to an angle of about 3°. If the angle becomes more flat, then a sufficient endurance limit or strength of the lining is no longer attainable.

Coatings from the system $Al_2O_3 \cdot SiO_2$ are usable in the first instance as material for the metal oxide-containing layer insofar as they possess the requisite temperature resistance. Still other oxidic components in different mixing ratios may be admixed to the main components $Al_2O_3$ and possibly $SiO_2$ as stabilizers or binders. As a result thereof, different properties of the coating, such as, for example, thermal expansion, or fusing temperature can be varied within a considerable band width and can be matched to those of the fiber material. It may be advantageous in some situations to draw the metal-oxide-containing layer additionally about the edges of the mat so that only the backside of the mat remains non-coated.

The metal oxide-containing layer can be applied on the fiber mat according to different methods. According to the plasma-jet-spraying process, particularly simple heat-proof or non-combustible layers can be made of mullite-, spinell-, and $Al_2O_3$ powders. The powder particles are well fused in the plasma jet, are relatively highly fluid and can form a good interlocking with the fiber material upon the impingement on the fiber mat. The same is true for the flame spraying in which the same materials can be used.

In addition to these thermal spray methods, the metal oxide-containing layer may also be applied as glaze. Glazes can be built up of many oxides. They form during the baking a liquid phase which, after the solidification, adheres by wetting on the base material. By reason of the good chemical compatibility with the ceramic fiber mat, layers from the system $Al_2O_3 \cdot SiO_2$ are preferred. Depending on the coating method, spraying or dipping, the glaze penetrates more or less deeply into the fiber mat. As the coatings are to be resistant at temperatures of up to 1,250° C. and higher, the use of pure frit glazes is not suitable. More specifically, they contain, as a rule, larger quantities of $B_2O_3$ which evaporates above 1,200° C. Similarly, larger proportions in alkalies are to be avoided in the glaze because they contribute to a softening of the glaze already at low temperatures. By reason of the chemical compatibility admixtures of PbO and ZnO in the glaze are to be avoided because reactions are to be expected with the fibers in the contact area.

In addition to the classic glazes also so-called Engobes can be used. Engobes are clay glazes which still continue to be porous after the baking and exhibit hardly a glaze or shininess. They consist of a mixture of Kaolin chamotte and a silicate glaze as binding agent. A suspension of these two components is applied on the fiber mat as paste or slip and is baked on the mat after the evaporation of the suspension agent, generally water.

A further possibility to manufacture the metal oxide-containing layer which is to protect the fibers of the fiber mat against the erosion by the flowing gases, consists in coating the same with $Al_2O_3$ by means of a clay-bond or alumina slip and to bake the same subsequently. An advantage of these clay-bond or alumina coatings consists in that the base body, namely the fiber mat and the cover layer have similar chemical and physical properties.

Phosphate-linked alumina slips set well already during the drying so that the coatings have sufficient gross breaking strength exist. The aluminum phosphate $AlPO_4$ acts as so-called high temperature binder and imparts to alumina containing masses a high abrasion resistance. The clay-bond or alumina slip can be applied particularly favorably on the fiber bodies by brushing. In addition to the phosphate-linked alumina slips, also silicic acid-linked alumina slips can be utilized. An advantage with the use of colloidal silicic acids as binder resides in that the coating can be coordinated to the $Al_2O_3 \cdot SiO_2$ system and the desired mullite formation at the contact places can be favored. In addition to $Al_2O_3$ and $SiO_2$, the slip may also contain $MgO$, as well as slight quantities of $CaO$ and $K_2O$.

The manufacture of fiber mats suitable for the coating, in addition to making the same by pressing, can also be realized in that the suspending liquid is sucked off from a suspension of fibers. During the suction operation, the fibers then orient themselves perpendicularly to the suction direction. With very thick fiber mats to be remitted, it may be of advantage if one utilizes initially a fiber mat in which the fibers extend as customary parallel to the surface and in that one then applies on this mat a second layer of fibers, for example, of different thickness, possibly under interposition of a binding medium layer, in which the fibers form an angle of 30° to 90° with the metal oxide-containing layer to be applied. The thickness of the metal oxide-containing layer must be matched depending on thermal expansion and elasticity module to the base material in order to prevent stress super-elevations in the composite structure. In general, layer thicknesses of more than 200 μm have proved sufficient. Preferred are layer thicknesses of 200 to 500 μm because they possess a very good strength.

BRIEF DESCRIPTION OF THE DRAWINGS

These and other objects, features and advantages of the present invention will become more apparent from the following description when taken in connection with the accompanying drawing, which shows, for purposes of illustration only, two embodiments in accordance with the present invention, and wherein.

DETAILED DESCRIPTION OF THE DRAWINGS

Figure 2:
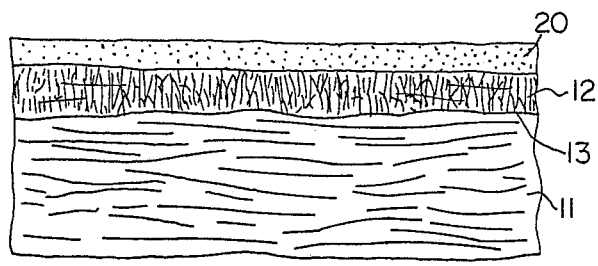
FIG. 2 is a somewhat schematic cross-sectional view of a second embodiment of a heat-insulating lining in accordance with the present invention.
Figure 1:
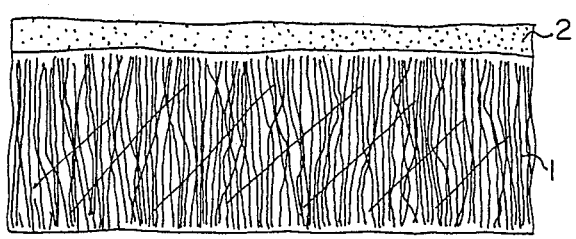
FIG. 1 is a somewhat schematic cross-sectional view through a first embodiment of a heat-insulating lining in accordance with the present invention.

Referring now to the drawing, and more particularly to FIG. 1, the fiber layer 1 consisting essentially of $Al_2O_3$ can be recognized in this figure whose fibers extend predominantly at an angle of about 30° to 90° to the $Al_2O_3$ layer 2 applied by plasma jet spraying. In FIG. 2, the fiber layer consists of two partial layers 11 and 12. The metal oxide-containing layer 20 is disposed on the layer 12 in which the fibers extends essentially perpendicularly to the metal oxide-containing layer whereas the layer 12 is connected under interposition of a ceramic binding layer 13 with the layer 11 in which the fibers extend as heretofore customary in parallel to the layer 20. The mat, in addition to forming a flat body, may also form complicated spatial (three-dimensional) shapes, for example, may be provided with projections, may be constructed of conical pyramid shape or cone shape and the like.

The advantages attainable with the present invention consist, above all, in that by maintaining the parameters according to the present invention of gross density and fiber orientation, one can make in a simple manner heat-insulating linings which are durable and stable mechanically and exhibit an extraordinarily good thermal shock resistance.

While we have shown and described only two embodiments in accordance with the present invention, it is understood that the present invention is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A heat-insulating lining for a gas turbine, consisting of a mat formed from ceramic fibers which is provided on its side facing the hot gas with a metal oxide-containing layer, wherein the mat formed of ceramic fibers possesses a gross density of between 350 and 450 kg/m³, and wherein the fibers in the mat which are in contact with the metal oxide-containing layer are so oriented that the longitudinal axis of the fibers forms an angle of about 30° to about 90° with the metal oxide-containing layer.

2. A heat-insulating lining according to claim 1, in which the fiber layer consists of two partial fiber layers.

3. A heat-insulating lining according to claim 2, in which the fibers in the partial fiber layer in contact with the metal oxide-containing layer are so oriented that they extend at an angle with respect to the fibers inside the other partial layer.

4. A heat-insulating lining according to claim 3, wherein said partial fiber layers are connected with each other under interposition of a ceramic binder layer.

5. A heat-insulating lining according to claim 4, wherein the fibers in the other partial fiber layer are oriented at least approximately parallel to the metal oxide-containing layer.

6. A heat-insulating lining according to claim 2, wherein said partial fiber layers are connected with each other under interposition of a ceramic binder layer.

7. A heat-insulating lining according to claim 3, wherein the fibers in the other partial fiber layer are oriented at least approximately parallel to the metal oxide-containing layer.

* * * * *